# 3,380,174
METHOD AND APPARATUS FOR CONDITIONING GRAIN
Jay L. McClaren, Garden City, Kans.
(Box 142, Kandiyohi, Minn. 56251)
Filed Aug. 15, 1966, Ser. No. 577,565
9 Claims. (Cl. 34—26)

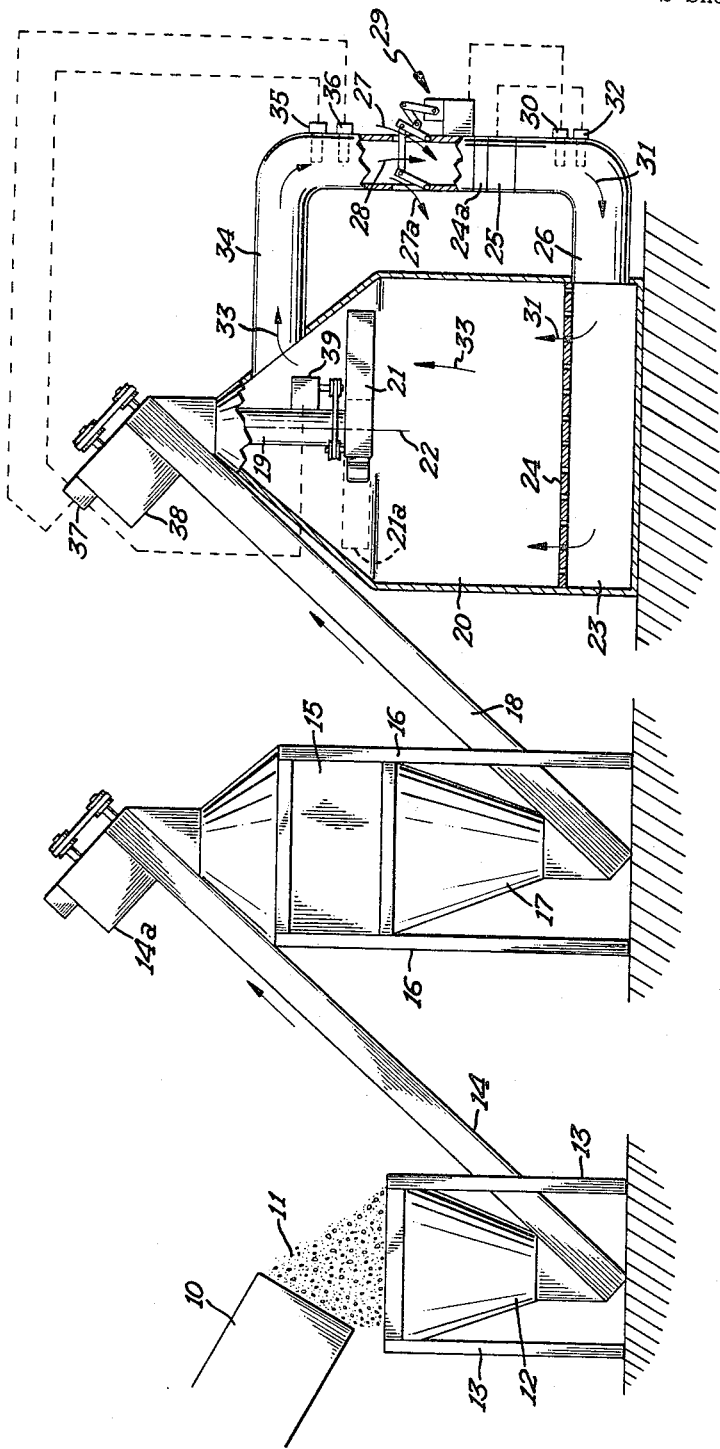

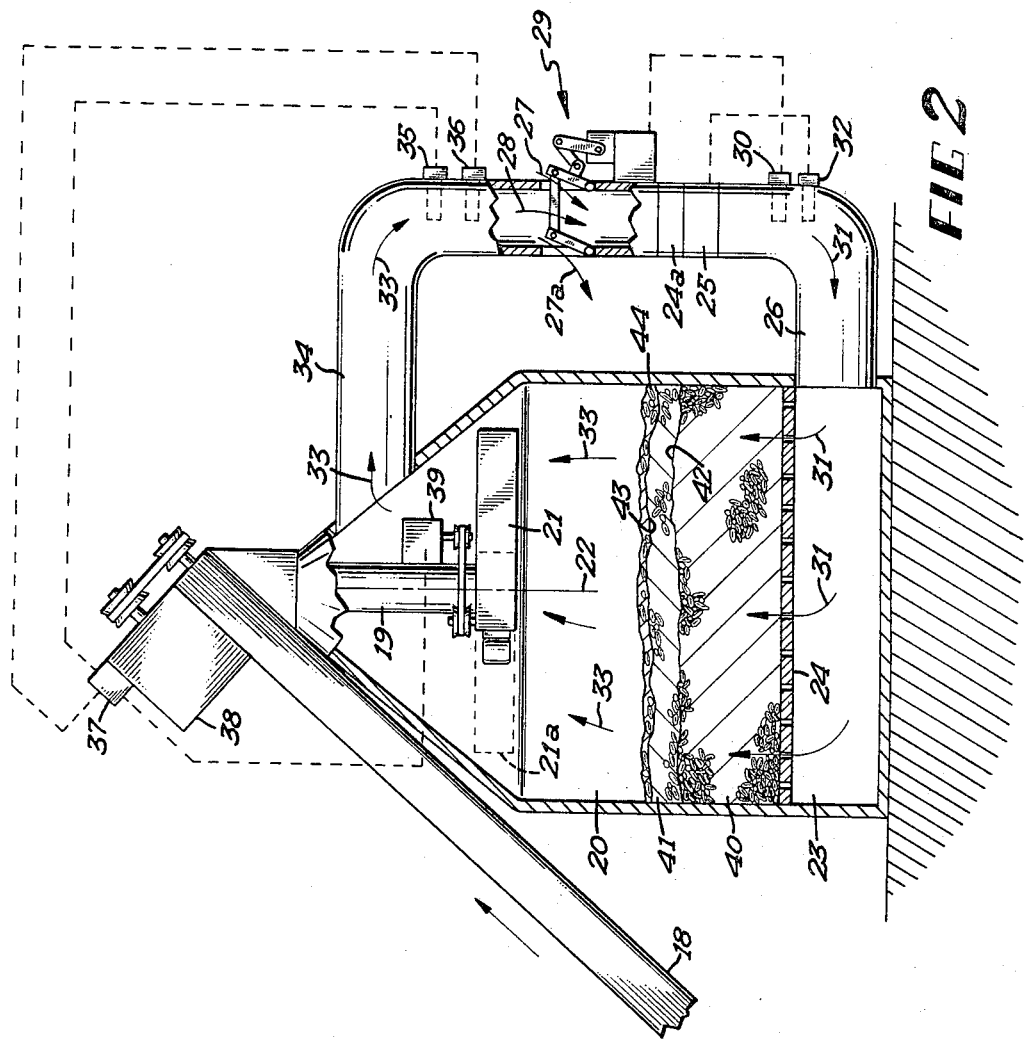

This invention relates to a method and apparatus for conditioning grain and, more particularly, relates to a method and apparatus for drying grain harvested from the field to a specific moisture content utilizing a closed circuit system.

It is well known that the optimum period in which harvesting of grain should be conducted is at the time after maturity during which the moisture content of the grain approximates 26%. Not only does harvest at this time minimize the danger of damage to the crop from late season bad weather, but increased yields of up to 20% are oftentimes realized with an attendant increase of profits of sometimes more than 50%. However, most grain species with a moisture content ranging from 25 to 27%, typical of the moistures within grain at the optimum harvest time, cannot be effectively stored. Storage of a grain crop at a higher moisture percentage than recommended will frequently result in mold and subsequent extensive spoilage. Safe maximum moisture content of grains for long term storage of most grain types approximates 12%. Therefore approximately 13 to 15% moisture must be taken from grain which is harvested at the optimum time in order to arrive at optimum moisture perecntages for storage.

When grain is sold and has a moisture content greater than a predetermined amount, for example, 16% moisture rather than the optimum 12% moisture, a specific price per bushel is deducted from the high-moisture content grain to arrive at the selling price. On the other hand, for grain which is dried to a percent of moisture considerably less than 12% an adjustment is typically not considered. It is therefore advantageous for the seller of grain to maintain his grain at the highest moisture percent at which it can be stored in order to receive the largest return on his investment.

Presently available grain drying and storage units, because of shortcomings inherent in their design, do not uniformly dry grain. Oftentimes, an extremely dry area or an extremely wet area result after complete drying has been carried out within a bin. Therefore, spoilage may occur in some areas, and in other areas, the grain may not bring the highest dollar per unit. Further, in a completely finished bin containing grain which has not been uniformly dried throughout, there may be moisture migration from the wet areas to the dry areas resulting in an entire bin with grain moisture content at a higher percentage than desirable.

Presently available methods and apparatus do not have a provision for disposing of the grain immediately upon harvesting in an efficient, economical manner. Typically, the trucker, in order to determine which of several storage bins should be utilized to receive the trucked grain, must probe the storage bin from the top to determine which bin has a minimum amount of wet grain covering the grain being dried in the conventional manner. After determining which bin has the proper amount of wet grain covering the grain being dried, the trucker may then dispose of his load. Further, the owner of the storage bins, typically the farmer who owns the property on which the grain is being harvested, must take time from supervising the harvest to check the drying bins in order to make any adjustments which may be necessary to control the drying which is being conducted in the storage bins. Among the controls which must be checked are the burner controls on the heat blower which receives ambient air and conducts the air, after heating, into the partially filled grain bin to be exhausted into the atmosphere after passing through the grain stored therein.

At the present time there are two different ways in which to dry grain. Each way uses a round bin having a perforated floor and a fan and heater. In the first method, multiple layer drying, the grain is dried and stored in the same bin. The moist or wet grain is dried in layers up to four or five feet deep. When a layer has been dried, another layer of wet grain may be added. The cycle may be repeated until the depth of grain reaches sixteen to twenty feet. In this method, the grain is dried with air that is raised 15 to 20° F. from ambient conditions. In the second method, bin batch drying the bin is loaded with two and one-half to three feet of wet or moist grain. The grain is dried, cooled and unloaded from the bin. Then another layer, or batch, can be dried. Utilizing this method, the grain is dried faster since the air flow may pass through the grain at a considerably higher temperature, for example, of course, this method requires added facilities for loading and unloading the grain from the bin.

Each of the above methods exhausts the moisture-laden air which has passed through and accepted moisture from the wet grain into the atmosphere. Further, at harvest time, the crop may be harvested faster than either method may dry the grain to the optimum moisture content. Consequently, the operator typically raises the temperature of the air passing through the grain in order to dry faster. This not only results in a stored grain product with lower than necessary moisture, and therefore lower profits, but also results in high operation costs.

Each of the above systems has a common drawback in that neither provides for automatic handling of the grain without the need for manual, periodic checks on the controls; and neither system provides for receiving a large load or a periodic high frequency of wet grain unloadings which occur during harvesting.

With these comments in mind it is to the elimination of these and other disadvantages to which the prevent invention is directed along with the inclusion therein of other novel and desirable features.

An object of my invention is to provide a new and improved method and apparatus of simple and inexpensive operation and construction for the purpose of drying or cooling grain.

Another object of my invention is the provision of a method and apparatus which automatically dries or cools ceives grain to be dried or cooled efficiently and in economical amounts thereby eliminating direct supervision of the drying operation.
grain to a predetermined moisture content and which re- Still another object of my invention is the provision of a closed circuit method and apparatus which automatically controls moisture and temperature of the product being dried utilizing the air taken from the system and treated to predetermined conditions for flow through dried grain without disturbing the equilibrium conditions thereof and thereby allowing the system to receive peak unloadings of harvested grain without the need for checking any of the bins before dumping.

A still further object of my invention is the provision of means supplying moist or wet grain to be dried to the bin in response to temperature and moisture requirements of the recirculating air thereby effecting optimum operation of the drying system.

Another object of my invention is the provision of an improved method and apparatus for drying or cooling grain which provides for addition of wet grain in such a way that a drying zone is maintained at the uppermost portions of the grain stored within the drying bin and with sufficient control of the addition of wet grain to prevent a second lower moisture content drying zone which would decrease the profit on the dried and stored grain. Further, the addition of wet grain is made in such quantities that the balance of the circulating air is not destroyed and the grain dried is not affected.

Still another object of my invention is the provision of automatic control of the conditions of the supply air which may or may not be mechanically cooled and which passes through the dried grain which is at equilibrium in the order to permit maintenance of the necessary humidity to prevent overdrying of the grain during the cooling process.

These and other objects and advantages of my invention will more fully appear from the following description made in connection with the accompanying drawings wherein like reference characters refer to the same or similar parts throughout the several views, and in which:

FIG. 1 is schematic diagram showing the apparatus of my invention and indicating the method of drying or cooling grain; and FIG. 2 is a schematic sectional view of the drying and storage bin of my invention showing grain being dried therein at a specific point of time during drying.

One form of the present invention is shown in the drawings and is described herein.

Referring to FIG. 1, a portion of a truck 10 is shown discharging wet harvested grain 11 into a receiving hopper, denoted in general by numeral 12 and supported, typically on the ground, by suitable supporting legs 13. The receiving hopper 12 discharges grain into a standard commercially available screw conveyor of a selected capacity and indicated by numeral 14 and having a drive unit 14a, to convey the material to the upper portions of the holding bin 15. The holding bin is of commercially available construction and holds a selected number of bushels of wet grain prior to drying. The bin is typically constructed of galvanized metal and has suitable supporting legs 16 and a discharge hopper 17. Hopper 17 discharges wet grain into screw conveyor 18 which receives the wet grain from the holding bin 16 through hopper 17 and conveys the wet grain through the conveyor into the driving and storage bin receiving hopper 19 mounted on the drying and storage bin 20. The screw conveyor 18 is of a commercially available construction and is similar to screw conveyor 14. Screw conveyor 18 discharges into hopper or chute 19 and the grain is received into a horizontally oriented screw conveyor 21 which entire unit is adapted to rotate about a vertical axis, denoted by the numeral 22. A selected position of the rotatable screw conveyor is indicated by the dotted lines at numeral 21a. Of course, the screw conveyor 21 may rotate and stop at any selected position about the upright axis 22 relative to the grain discharged within the bin. It should be noted, of course, that the holding bin and supply screw conveyor 14 may be omitted if the hopper 12 is of sufficient size and so is directly attached to the conveyor 18. Typically, the receiving hopper must be small for receiving and handling wet grain and the most advantageous way gas has been to place an intermediate holding bin within the system. However, the description of the intermediate holding bin between the receiving hopper 12 and the drying bin 20, is not intended to in any way limit the scope of my invention. Further, the holding bin may service several storage and drying bins required.

The drying and storage bin 20 is a commercially available structure and is available in widely varying diameters and in heights. The bin is typically constructed of a galvanized steel or other rigid material. Screw conveyor 21 is of conventional design but includes a perforated screw conveyor housing to permit the conveyed wet grain to flow evenly across the storage bin floor. Bin 20 includes a plenum chamber 23 disposed at the lowermost portion of the bin. A perforate plate 24, constructed from a rigid, generally metallic material and having perforations therein of a size smaller than the diameter of the grain stored within the bin separates the plenum from the grain. The plenum is adapted to receive air supplied under pressure by fan 24a, which air is heated by heater 25 prior to entry into the duct 26, into the plenum chamber 23. Ambient air, denoted by the arrow 27 and return air denoted by the arrow 28 is blended by the damper 29 on the inlet side of fan 24a prior to being heated by heater 25. Fan 24a and heater 25 are standard commercially available items. A humidistat 30 is so interposed in supply air stream 31 in duct 26; and a thermostat 32 is interposed in air stream 31 as shown. Supply 31 is composed of ambient air 27 and return air 28 in the proportion determined by the position of damper 29. The position of damper 29 is controlled by humidistat 30 which is set dependent upon the equilibrium conditions desired for the dried grain within the bin. Further, the temperature of the air 31 is controlled by the action of thermostat 32 which is operably connected to heater 25 to maintain the supply air 31 at the conditions necessary to maintain the dried grain at equilibrium.

Flow of supply air is indicated in the direction of the arrow 31 and after proceeding through the dried grain and through the layer of wet grain to be dried air 31 experiences a resultant temperature decrease and humidity rise becoming return air 35. The return air 33 at the lower temperature and higher humidity is then recirculated through return duct 34 on the suction side of fan 24a and contacts humidistat 35 and thermostat 36 which are interposed in duct 34 on the inlet or return side of the damper 29 and fan 24a.

Humidistat 35 and thermostat 36 are operably connected to controls 37 on the drive motor 38 of conveyor 18. Depending on the control settings, either the humidistat or the thermostat or both actuate the controls. Motor 38 drives conveyor 18 thereby discharging wet grain into chute 19 and subsequently into conveyor 21 for distribution within bin 20, in response to a predetermined settings on the humidistat and thermostat. When the temperature of the return air reaches a predetermined high point, or the humidity reaches a predetermined low point, additional wet grain is added. A timer mechanism may be interposed in the circuit such that only a predetermined amount of grain is added when the humidistat and thermostat is not satisfied. This prevents overload of wet grain on the dried grain thereby destroying the drying front. Motor 38 is operably connected to motor 39 which drives conveyor 21, rotating the entire conveyor 21.

Referring to FIG. 2, bin 20 is shown in detail having dried grain 40 stored therein. A transverse, disc-shaped layer of grain 41 is shown disposed above dried grain 40. Grain 41 is wet and is placed on grain 40, uniformly in a transverse disc by rotating screw conveyor 21. At the lower edge of wet grain 41, indicated at 42, the conditions of the grain on this line very closely approximate the conditions of grain 40. On the other hand, the conditions of the top layer, indicated at 43, very closely approximate the conditions of the incoming wet grain. The thickness of layer of grain 41 is from two to six inches. Layer 44 represents the amount of grain added in response to humidistat and thermostat 35 and 36 respectively and dependent on a timer if used. This layer is relatively thin as compared to layer 41.

To more clearly explain the operation of the method and apparatus of my invention, I have selected, as an example, a situation in which corn harvested at 22% moisture and weighing 60.6 lbs./bu. must be dried. In order to dry the harvested corn to 12% moisture and 53.8 lbs./bu., 6.8 lbs./bu. of water must be removed from the corn. Standard psychrometric charts are available to determine the settings necessary to effect moisture removal. Consider that the ambient air conditions are at 50° and 40% relative humidity. Based on charts for specific grains, which are readily available from, for example, the Iowa State University of Science and Technology, Cooperative Extension Service, Ames, Iowa, it may be determined that in order to obtain 12% moisture content corn, supply air must be circulated through dried corn at 60° and 54% relative humidity. This information is interpolated from a chart on page 3 of Iowa State University Pamplet 313. At the selected conditions of the supply air, denoted in FIG. 2 at 31, grain which has been dried to 12% moisture will not be changed as supply air 31 under the above-mentioned conditions flows through. However, the grain in the area denoted by 41, will experience a change with the supply air, upon passing through area 41, decreasing in temperature and increasing in humidity. Measuring return air 33, after it has passed through area 41, the temperature approximates 52.5° F. and the humidity approximates 90%. Therefore, return air 33 must be modified to return it to a temperature and humidity which will not effect the 12% moisture, dried corn. In order to do this, dampers 29 are controlled to allow ambient air at 50° and 40% relative humidity to flow inwardly into the return duct as indicated by arrow 27. At the same time, an excess amount of return air flows outwardly of the duct in the direction of arrow 27a. The dampers would approximate a position in which one-third of the air is ambient and two-thirds is being recirculated. The cooler return air may then be heated by heater 25 to arrive at the proper air conditions for recirculating as supply air through the bin 20. Air at 60° F. and 54% relative humidity will hold .00590 lb. of water per lb. of air. Air at 52.5° F. and 90% relative humidity holds .00764 lb. of water per lbs. of air. Therefore, each pound of air which flows through bin 20 removes .00174 lb. of water. With these figures available, of course, it is easy to calculate drying rates, operational expense and other information. Of course, psychrometric charts and other manufacturer's charts may be consulted for determination of temperature and humidity requirements for other grains as well as for other ambient air conditions and varying capacities of bins.

Humidistat 35 and thermostat 36 are set dependent upon the material being dried, ambient conditions and moisture content desired. Referring to the above example, the humidistat may be set to effect addition of grain at such times as the humidity falls below, for example, 80% or the temperature rises above 59° or both. When the humidity of the return air 33 falls below a level which is determined by experience with respect to the given installation, additional moisture is needed so that the conditions of the incoming supply air 31 are maintained as required by the available charts. It is particularly important that the wet grain 44 is added in small layers and does not deposit in a thick layer such that the conditions of return air 33 reach the dew point causing condensation in layer 44 thereby preventing moisture absorption by return air 33 by depleting vapor available to the supply air 31 as it makes the transition to return air. It is therefore necessary to interpose a timer mechanism in the circuitry which joins humidistat and thermostat 35 and 36 respectively to the controls 37 of screw conveyor 18. In this way, the amount of grain which is added whenever the humidistat or thermostat is not satisfied, may be controlled. Experience with the storage and drying bin system will quickly give an indication as to the proper time delay needed.

To determine the capacity of the above example, it can be assumed that ten thousand cubic feet of air per minute divided by 13.15 cubic feet of air per lb. multiplied by the number of minutes and hours per day will approximate one million, one hundred thousand lbs. of air per day passing through the bin. This, of course, is figured on a twenty-four hour day. In the example, it was determined that each lb. of air removes .00174 lb. of water and dividing this figure by the water which must be removed per bushel, which was calculated above as 6.8 lbs./bu., gives the number of bushels which may be dried per day; in this example amounting to two hundred eighty bushels.

As a comparison, a system which does not utilize recirculation of the return air may be considered. The ambient air is at 50° F. and 40% relative humidity. This, therefore, would control the conditions of the supply air which must pass through the corn 40. However, corn will not maintain equilibrium conditions of 12% moisture when air temperature and humidity other than 60° F. and 54% relative humidity pass through. The equilibrium conditions of the corn would decrease accordingly to accommodate the temperature and humidity variations until such time as the corn was at equilibrium based on the conditions of the air flowing therethrough. The example utilizing ambient air conditions as the supply air would result in a corn moisture content of 9% after drying, based on charts available from the Iowa State University and cited herein.

A full bin of grain may be cooled for winter storage by simply setting the temperature of the supply air at the desired temperature of the grain to be stored. In order to maintain the grain stored within the bin at the required 12% moisture, a specific relative humidity for the supply air may be selected from charts such as the charts specified above and air recirculated at the specific conditions of temperature and humidity until such time as the entire volume of grain within the bin is lowered in temperature without disturbing the moisture content therein.

From the foregoing it will be seen that I have invented a new and improved method and apparatus for conditioning grain. My method and apparatus is applicable to all types of grains and is flexible in its ability to be utilized regardless of ambient conditions with a minimum of control adjustment. Further, I have provided means for convenient disposition of wet grain within a holding bin thereby eliminating any necessity to check a storage and drying bin prior to adding grain to the bin, thereby greatly reducing the workload of the bin owner at harvest time. My double-damper control system blends the return air and the ambient air to maintain the desired relative humidity for the supply air such that the dried grain does not vary in moisture content. Correspondingly, I have provided a heater and control means therefor to automatically condition the supply air such that the equilibrium conditions of the grain stored within the bin are maintained automatically and without any attention whatsoever from the operator. It should be noted that any suitable source of heat may be used in conjunction with my apparatus as well as any suitable damper means. Further, conveyors other than screw conveyors and means for distributing grain within the bin other than the rotatable screw conveyor may be utilized.

It will, of course, be understood that various changes may be made in the steps of my method and details, arrangement and proportions of the various parts without departing from the scope of my invention.

What is claimed is:
1. A method for conditioning grain, said method comprising the steps of
supplying supply air under pressure and at predetermined conditions of temperature and humidity into a substantially closed bin having wet grain therein,
circulating the supply air through the bin and the wet grain contained therein whereby moisture within the wet grain is transferred to the supply air as it passes upwardly through the grain resulting in return air having a higher humidity and a lower temperature than the supply air,
receiving the return air into a return duct,
measuring the temperature and humidity of the return air,
adding wet grain into the closed bin in response to predetermined conditions of the measured return air,
blending ambient air with the return air in a predetermined amount in response to predetermined humidity required of the supply air, and
heating the return air in combination with the predetermined amount of ambient air to the predetermined temperature of the supply air thereby providing supply air available to be supplied under pressure to a closed bin, the supply air having predetermined conditions of temperature and humidity.

2. The method of claim 1 wherein wet grain is added into the closed bin in response to predetermined conditions of the return air and in relatively thin layers to permit maintenance of a grain drying zone at the uppermost portions of the grain within the bin.

3. The method of claim 1 wherein the supply air is circulated upwardly through the grain stored within the bin and at conditions of temperature and humidity corresponding to the equilibrium temperatures and humidity of the dried grain stored within the bin whereby a second lower moisture content drying zone in the dried grain is prevented from forming.

4. The method of claim 1 wherein supply air is supplied under pressure into the closed bin having wet grain therein at a lower humidity and higher temperature than the corresponding conditions of the return air.

5. An apparatus for conditioning grain, said apparatus comprising a bin adapted to contain grain therein for conditioning and storage, said bin adapted to receive supply air for circulation through grain stored therein, the supply air thereby becoming return air, and said bin having means receiving grain therein, supply air duct means affixed to said bin to permit supply air to circulate through said bin, return air duct means affixed to said bin and adapted to receive return air from said bin, said return air duct means communicating with said supply air duct means thereby forming a closed circuit with said bin adapted to conduct supply air through said bin and to conduct return air from said bin, return air sensing means interposed in said return air duct means to permit measurement of the conditions of return air, wet grain supply means responsive to said return air sensing means whereby wet grain is supplied to said bin in response to said return air sensing means, ambient air blending means interposed in said return air duct to permit blending a predetermined amount of ambient air with the return air, heater means interposed in said return air duct to permit heating of the blended return air and ambient air to predetermined conditions, fan means interposed in said supply air duct means to permit furnishing of supply air under pressure to said bin, supply air sensing means interposed in said supply air duct means to permit measurement of the conditions of said supply air, said sensing means operably connected to said heater means and said ambient air blending means whereby supply air is provided having predetermined conditions.

6. The apparatus of claim 5 wherein said return air sensing means comprises a thermostat and a humidistat and wherein said supply air sensing means comprises a thermostat and a humidistat, said supply air thermostat operably connected to said heater means and said supply air humidistat operably connected to said ambient air blending means.

7. The apparatus of claim 5 wherein said wet grain supply means is adapted to supply grain into said bin in relatively thin layers whereby the conditions of the return air are prevented from reaching the dew point causing condensation within the added layer.

8. The apparatus of claim 5 including timer means operably connected with said wet grain supply means whereby wet grain is supplied into said bin for a predetermined period of time responsive to said return air sensing means.

9. The apparatus of claim 5 wherein said bin includes a plenum chamber disposed generally under the grain adapted to be stored within the bin and a perforate plate disposed between the grain and the plenum chamber whereby supply air is received into the plenum chamber and flows upwardly therefrom through the perforate plate and through the grain stored in the bin.

References Cited

UNITED STATES PATENTS

| | | | |
|---|---|---|---|
| 3,129,073 | 4/1964 | Mathews | 34—56 |
| 3,217,424 | 11/1965 | Johnson et al. | 34—50 XR |
| 3,274,699 | 9/1966 | Naylor | 34—56 |

KENNETH W. SPRAGUE, *Primary Examiner.*